United States Patent
Youtz et al.

(10) Patent No.: US 9,906,992 B1
(45) Date of Patent: Feb. 27, 2018

(54) PDN MANAGEMENT BETWEEN LTE AND WIFI

(71) Applicant: Verizon Patent and Licensing Inc., Arlington, VA (US)

(72) Inventors: Andrew E. Youtz, Princeton, NJ (US); Kyriaki Konstantinou, New York, NY (US); Xin Wang, Morris Plains, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/478,669

(22) Filed: Apr. 4, 2017

(51) Int. Cl.
| | |
|---|---|
| *H04W 36/00* | (2009.01) |
| *H04L 29/06* | (2006.01) |
| *H04W 36/18* | (2009.01) |
| *H04W 76/02* | (2009.01) |
| *H04W 88/16* | (2009.01) |

(52) U.S. Cl.
CPC ..... *H04W 36/0033* (2013.01); *H04L 65/1016* (2013.01); *H04W 36/18* (2013.01); *H04W 76/026* (2013.01); *H04W 88/16* (2013.01)

(58) Field of Classification Search
CPC .. H04W 36/0033; H04W 4/22; H04L 61/6086
See application file for complete search history.

(56) References Cited

U.S. PATENT DOCUMENTS

| | | | | |
|---|---|---|---|---|
| 2013/0058275 | A1* | 3/2013 | Melia | H04W 60/005 370/328 |
| 2015/0350983 | A1* | 12/2015 | Kwok | H04L 65/1069 370/331 |
| 2016/0219464 | A1* | 7/2016 | Roeland | H04W 36/0022 |
| 2016/0219644 | A1* | 7/2016 | Zhao | H04W 76/028 |
| 2016/0316496 | A1* | 10/2016 | Dannebro | H04L 61/6086 |
| 2016/0366574 | A1* | 12/2016 | Dahan | H04W 4/22 |

* cited by examiner

*Primary Examiner* — Myron K Wyche

(57) ABSTRACT

A computer device may include a memory configured to store instructions and a processor configured to execute the instructions to receive a handover request from a user equipment (UE) device via an evolved Packet Data Gateway (ePDG), wherein the handover request includes a request for a dual Packet Data Network (PDN) context and designate the UE device as having dual PDN context, based on the received handover request. The processor may be further configured to identify an Internet Protocol (IP) address for a Long Term Evolution (LTE) bearer associated with the UE device; create a PDN session to the ePDG using the IP address, based on the UE device having the dual PDN context; and send a Protocol Configuration Options (PCO) message to the UE device via the ePDG, wherein the PCO message includes an indication of dual PDN context support; and select to maintain the LTE bearer.

20 Claims, 11 Drawing Sheets

PDN MANAGEMENT BETWEEN LTE AND WIFI

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may manage a large number of devices, resulting in various technological challenges. One example of such technological challenges includes managing interactions between cellular wireless networks and WiFi networks.

DETAILED DESCRIPTION OF PREFERRED EMBODIMENTS

Figure 1:
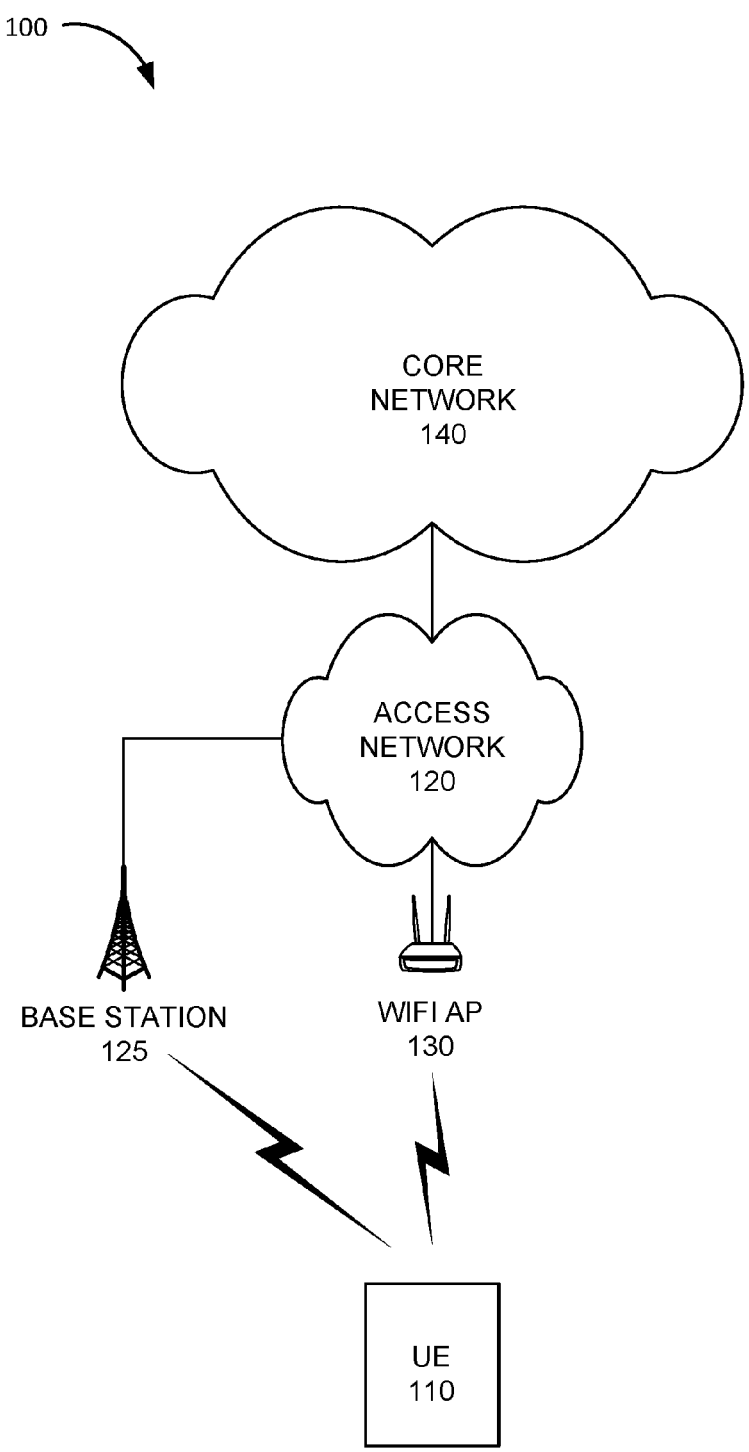
FIG. 1 is a diagram illustrating an environment according to an implementation described herein.

The following detailed description refers to the accompanying drawings. The same reference numbers in different drawings identify the same or similar elements.

A user equipment (UE) device, such as a smart phone, may attach to a wireless access network, such as a Long Term Evolution (LTE) network, using a packet data network (PDN) connection. When the UE device connects to a WiFi network, the UE device may move the PDN connection to the WiFi network to facilitate a Voice Over WiFi (VoWiFi) connection. However, in order to be able to successfully transfer back to the LTE network when the UE device moves out of range of the WiFi network, the UE device may need to stay connected to the LTE network. Otherwise, the UE device may need to perform an attach procedure to connect to the LTE network, which may take several seconds and may result in the call being dropped.

In order to stay connected to the LTE network, the UE device may stay attached using a default Internet access PDN connection while not actually sending any data over the Internet access PDN connection. At the same time, the UE device may use a different PDN connection (e.g., a connection to an Internet Protocol (IP) Multimedia Subsystem (IMS) PDN connection) for VoWiFi via the WiFi network. When the UE device moves out of range of the WiFi network, the UE device requests a handover of the IMS PDN connection to the LTE network. Maintaining a PDN connection (e.g., keeping a connection "warm" to maintain attachment) while processing a handover for a different PDN connection may waste the resources of the LTE network and complicate processing by the UE device, as the UE device has to manage multiple LTE attachments.

Moreover, using a default PDN connection to stay attached to an LTE network may not allow flexibility in moving particular PDN connections from an LTE network to a WiFi network or vice versa. As an example, a business customer may require that UE devices for its employees connect to a particular Access Point Name (APN) associated with a private network for the business, and a PDN connection to the particular APN may need the flexibility to move between a WiFi network and an LTE network. As another example, a user may not subscribe to a data plan and thus the user's UE device may not have an Internet PDN connection. Thus, when an IMS PDN connection exists on WiFi, there is no PDN connection to keep the UE device connected to LTE.

Implementations described herein relate to packet data network (PDN) management between LTE and WiFi networks. In some implementations, a UE device is configured to attach to an LTE network without setting up a PDN connection. The UE device may stay attached to the LTE network without a PDN connection as long as the UE device performs periodic tracking area updates. The UE device may request a PDN connection (e.g., for an IMS PDN, an Internet access PDN, etc.) when needed and may request a handover of the PDN connection to a WiFi network or from the WiFi network back to the LTE network without impacting the LTE attach status of the UE device. Thus, not requiring a PDN connection to remain attached to an LTE network may conserve the resources of the LTE network. Furthermore, if the UE device is not attached to an LTE network and is using a PDN connection via a WiFi network, when an LTE network becomes available, the UE device may attach to the LTE network without setting up a PDN connection and the existing PDN connection may be later moved over to the LTE network from the WiFi network when the UE device requests a handover.

In other implementations, PDN management between LTE networks and WiFi networks may be performed using Protocol Configuration Options (PCO) messages. A UE device may be configured to include request for a dual PDN context in a PDN connection request. A dual PDN context may indicate that that the UE device is associated with a PDN connection that is transferable between an LTE network and an evolved Packet Data Gateway (ePDG) associated with a WiFi network and that the PDN connection is associated with the same IP address whether connected via the LTE network or the WiFi network. The LTE network may respond to the request by providing an indication of dual PDN context support in a PCO message sent to the UE device during attachment or a handover.

A computer device that operates as a PDN Gateway (PGW) of an LTE network may be configured to store a database of UE devices that identifies, for a particular UE device, whether the particular UE device has dual PDN context and whether the particular UE device is associated with an active LTE bearer or an active WiFi bearer.

The computer device may be configured to process handovers from LTE to WiFi. For example, the computer device may be configured to receive a handover request from a UE device via an ePDG device. The handover request may include a request for a dual PDN context. The computer device may designate the UE device as having dual PDN context, based on the received handover request; identify an IP address for an LTE bearer associated with the UE device; and create a PDN session to the ePDG device using the identified IP address, based on designating the UE device as having the dual PDN context. The computer device may further send a PCO message to the UE device via the ePDG device that includes an indication of dual PDN context support. Moreover, the computer device may select to maintain the LTE bearer and select not to send traffic via the maintained LTE bearer while the created PDN session to the ePDG device is active. Furthermore, the UE device may continue to send data over the ePDG PDN connection and not send data over the LTE bearer, while the created PDN session to the ePDG device is active.

In some implementations, the dual PDN context may identify a dual IP Multimedia Subsystem (IMS) PDN context associated with an IMS APN. In other implementations, the dual PDN context may correspond to another type of dual PDN context associated with another type of APN, such as an APN associated with a gateway to a private network.

The computer device may be further configured to process handovers back to LTE from WiFi for a UE device associated with a dual PDN context. For example, the computer device may be configured to receive a handover request from the UE device via an eNodeB device, identify the UE device as having the dual PDN context, in response to receiving the handover request from the UE device via the eNodeB, re-activate the LTE bearer associated with the UE device, in response to identifying the UE device as having the dual PDN context, and tear down the PDN session to the ePDG device, in response to re-activating the LTE bearer associated with the UE device.

Moreover, the computer device may be further configured to generate a dual PDN context for a UE device connecting via WiFi when the UE device does not have an existing LTE attachment and may later attach the UE device to an LTE network using the generated dual PDN context. For example, the computer device may receive a PDN connection request from a UE device via the ePDG device with a request for a dual PDN context, designating the UE device as having dual PDN context, based on the received PDN connection request, and create a PDN session to the ePDG device based on the received PDN connection request. The computer device may further send a PCO message to the UE device via the ePDG device with an indication of dual PDN context support.

At a later time, the computer device may receive an attach request from the UE device via a Mobility Management Entity (MME) with a request for a dual PDN context. In response, the computer device may identify an IP address for the created PDN session to the ePDG device, create an LTE bearer for the UE device using the identified IP address for the created PDN session to the ePDG device, in response to receiving the attach request, and send another PCO message to the other UE device via the MME with an indication of dual PDN context support. The computer device may further select to maintain the LTE bearer for the UE device while the UE device is connected via the ePDG.

FIG. 1 is a diagram of an exemplary environment 100 in which the systems and/or methods, described herein, may be implemented. As shown in FIG. 1, environment 100 may include a UE device 110, an access network 120, a base station 125, a WiFi AP 130, and a core network 140.

UE device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. UE device 110 may be used for voice communication, mobile broadband services (e.g., video streaming, real-time gaming, premium Internet access etc.), best effort data traffic, and/or other types of applications.

In other implementations, UE device 110 may include an Internet of Things (IoT) computer device enabled with wireless communication functionality and employing machine-to-machine (M2M) communication, such as Machine-Type Communication (MTC), a type of M2M communication standard developed by the 3$^{rd}$ Generation Partnership Project (3GPP). For example, UE device 110 may include an embedded wireless MTC device that communicates wirelessly with other devices over a machine-to-machine (M2M) interface, such as a microcontroller controlling one or more actuators, a microcontroller controlling one or more sensors, a microcontroller processing data, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. An MTC device may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or another type of MTC device.

In other implementations, UE device 110 may correspond to an unmanned aerial vehicle or an unmanned aircraft system that communicates wirelessly with other devices over an M2M interface using MTC and/or another type of M2M communication. Examples of such airborne MTC devices include consumer drone devices used for entertainment, photo or video capture, payload delivery, and/or other uses; commercial delivery drones used to deliver packages to customers; law enforcement drones used for intelligence gathering operations; and/or other types of drones or aerial devices.

Access network 120 may provide access to core network 140 for wireless devices, such as UE device 110. Access network 120 may enable UE device 110 to connect to core network 140 for mobile telephone service, Short Message Service (SMS) message service, Multimedia Message Service (MMS) message service, Internet access, cloud computing, and/or other types of data services.

Access network 120 may establish a packet data network connection between UE device 110 and core network 140 via one or more Access Point Names (APNs). For example, access network 120 may establish an Internet Protocol (IP) connection between UE device 110 and core network 140 using a first APN and may establish a Session Initiation Protocol (SIP) connection to an Internet Multimedia Subsystem (IMS) using a second APN.

In some implementations, access network 120 may include a Long Term Evolution (LTE) access network (e.g., an evolved packet core (EPC) network) based on the LTE standard specified by the $3^{rd}$ Generation Partnership Project (3GPP). In other implementations, access network 120 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

In other implementations, access network 120 may include an LTE Advanced (LTE-A) access network and/or a 5G access network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Access network 120 may include a base station 125 and UE device 110 may wirelessly communicate with access network 120 via base station 125 when UE device 110 is located within the geographic area serviced by base station 125. Base station 125 may be part of an LTE eNodeB base station device. An eNodeB base station device may use the Evolved Universal Terrestrial Radio Access (E-UTRA) air interface to wirelessly communicate with devices. An eNodeB base station device may include one or more devices (e.g., base stations 130) and other components and functionality that allow UE device 110 to wirelessly connect to access network 120. The eNodeB base station device may include or be associated with one or more cells. For example, each cell may include an RF transceiver facing a particular direction. The eNodeB base station device may correspond to a macrocell or to a small cell (e.g., a femtocell, a picocell, a microcell, etc.).

WiFi AP 130 may include a device with a transceiver configured to communicate with UE device 110 using WiFi signals based on the Institute of Electrical and Electronics Engineers (IEEE) 802.11 standards for implementing a wireless LAN (WLAN) network. WiFi AP 130 may enable UE device 110 to communicate with other devices in a WiFi WLAN network (not shown in FIG. 1) and with access network 120 via a wired connection. As an example, WiFi AP 130 may be connected to a LAN switch or a router via a wired connection (e.g., an Ethernet cable) and the LAN switch or router may connect to access network 120. As another example, WiFi AP 130 may connect directly to access network 120.

Core network 140 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE device 110, and may interface with other external networks. Core network 140 may include one or more server devices and/or network devices, or other types of computation or communication devices. In some implementations, core network 140 may include an Internet Protocol Multimedia Sub-system (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
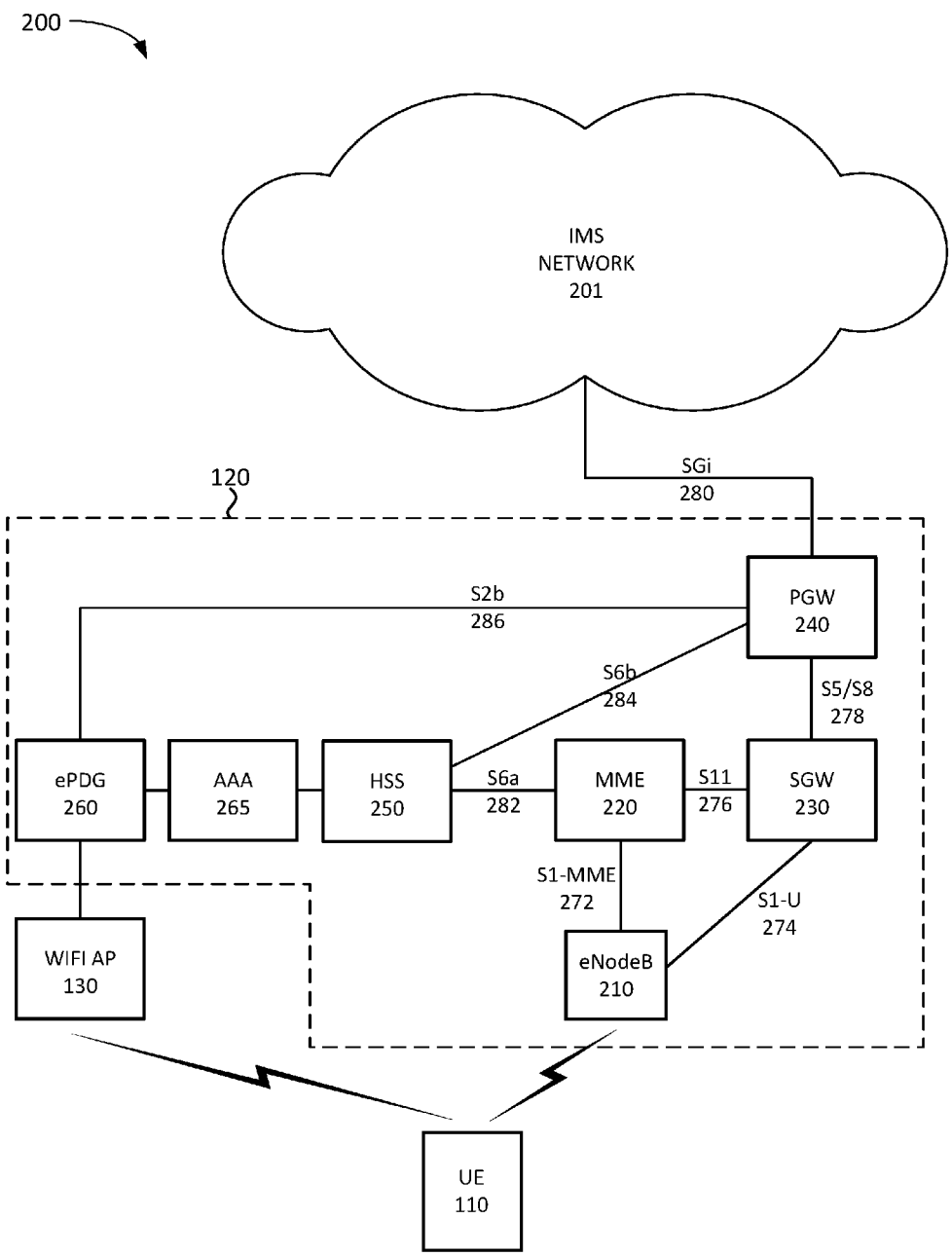
FIG. 2 is a diagram illustrating exemplary components of the access network of FIG. 1.

FIG. 2 is a diagram illustrating exemplary components of a system 200 that includes access network 120 and an IMS network 201 according to an implementation described herein. IMS network 201 may be included in core network 140 and may include a network for delivering IP multimedia services as specified by 3GPP or other standards/protocols and may provide media flows, including Voice over IP (VoIP) sessions, between UE device 110 and external IP networks or external circuit-switched networks.

As shown in FIG. 2, access network 120 may correspond to an LTE access network and may include devices that implement logical entities interconnected via standardized interfaces, and that provide wireless packet-switched services and wireless IP connectivity to user devices for both data and voice services. Access network 120 may include eNodeB 210 (corresponding to base station 125), a mobility management entity (MME) 220, a serving gateway (SGW) 230, a PGW 240, a home subscriber server (HSS) 250, an ePDG 260, and an Authentication, Authorization and Accounting server (AAA) 265. While FIG. 2 depicts a single eNodeB 210, MME 220, SGW 230, PGW 240, HSS 250, ePDG 260, and AAA 265 for illustration purposes, in practice, FIG. 2 may include multiple eNodeBs 210, MMEs 220, SGWs 230, PGWs 240, HSS 250, ePDGs 260, and/or AAAs 265.

eNodeB 210 may include one or more devices (e.g., base stations) and other components and functionality that allow UE device 110 to wirelessly connect to access network 120 (e.g., base station 135). eNodeB 210 may include or be associated with one or more cells. For example, each cell may include a radio frequency (RF) transceiver facing a particular direction. eNodeB 210 may interface with access network 120 via an interface referred to as an S1 interface, which may be split into a control plane S1-MME interface 272 and a data plane S1-U interface 274. S1-MME interface 262 may interface with MME 220. S1-MME interface 272 may be implemented, for example, with a protocol stack that includes a Network Access Server (NAS) protocol and/or Stream Control Transmission Protocol (SCTP). An S1-U interface 274 may interface with SGW 230 and may be implemented, for example, using GTPv2.

MME 220 may implement control plane processing for access network 120. For example, MME 220 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 220 may also select a particular SGW 230 for a particular UE device 110. A particular MME 220 may interface with other MMEs 220 in access network 120 and may send and receive information associated with UE devices 110, which may allow one MME 220 to take over control plane processing of UE devices serviced by another MME 220, if the other MME 220 becomes unavailable.

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface 278. S5/S8 interface 278 may be implemented, for example, using GTPv2.

PGW 240 may function as a gateway to IMS network 201 (and/or any other network associated with core network 140) through an SGi interface 280. A particular UE device 110, while connected to a single SGW 230, may be connected to multiple PGWs 240, one for each packet network with which UE device 110 communicates. For example, a particular PGW 240 may be associated with a particular APN and UE device 110 may connect to the particular APN by connecting to the PGW 240 associated with the particular APN. Thus, UE device 110 may be connected to one or more APNs at a particular time.

MME 220 may communicate with SGW 230 through an S11 interface 276. S11 interface 276 may be implemented, for example, using GTPv2. S11 interface 276 may be used to create and manage a new session for a particular UE device 110. S11 interface 276 may be activated when MME 220 needs to communicate with SGW 230, such as when the particular UE device 110 attaches to access network 120, when bearers need to be added or modified for an existing session for the particular UE device 110, when a connection to a new PGW 240 needs to be created, or during a handover procedure (e.g., when the particular UE device 110 needs to switch to a different SGW 230 and/or ePDG 260).

HSS 250 may store information associated with UE devices 210 and/or information associated with users of UE devices 110. For example, HSS 250 may store subscription profiles that include authentication and access authorization information. Each subscription profile may include a list of UE devices 110 associated with the subscription as well as an indication of which UE device 110 is active (e. g., authorized to connect to access network 120 and to core network 140). MME 220 may communicate with HSS 250 through an S6a interface 282. S6a interface 282 may be implemented, for example, using a Diameter protocol. PGW 240 may communicate with HSS 250 through an S6b interface 284. S6b interface 284 may be implemented, for example, using a Diameter protocol.

ePDG 260 may interface access network 120 with untrusted networks, such as a WiFi network associated with WiFi AP 130. ePDG 260 may establish a connection between WiFi AP 130 and PGW 240 after WiFi AP 130, and/or UE device 110 connecting to ePDG 260 via WiFi AP 130, has been authenticated and authorized. ePDG 260 may communicate with PGW 240 through an S2b interface 286. S2b interface 286 may be implemented, for example, using GTPv2. ePDG 260 may authorize and authenticate UE device 110 with HSS 250 via AAA 265. AAA 265 may perform authentication, authorization, and accounting functions for an untrusted device connecting to access network 120. For example, AAA 265 may communicate with HSS 250 via a Diameter protocol to perform authentication and/or authorization of UE device 110.

Although FIG. 2 shows exemplary components of access network 120, in other implementations, access network 120 may include fewer components, different components, differently arranged components, or additional components than depicted in FIG. 2. Additionally or alternatively, one or more components of access network 120 may perform functions described as being performed by one or more other components of access network 120.

Figure 3:
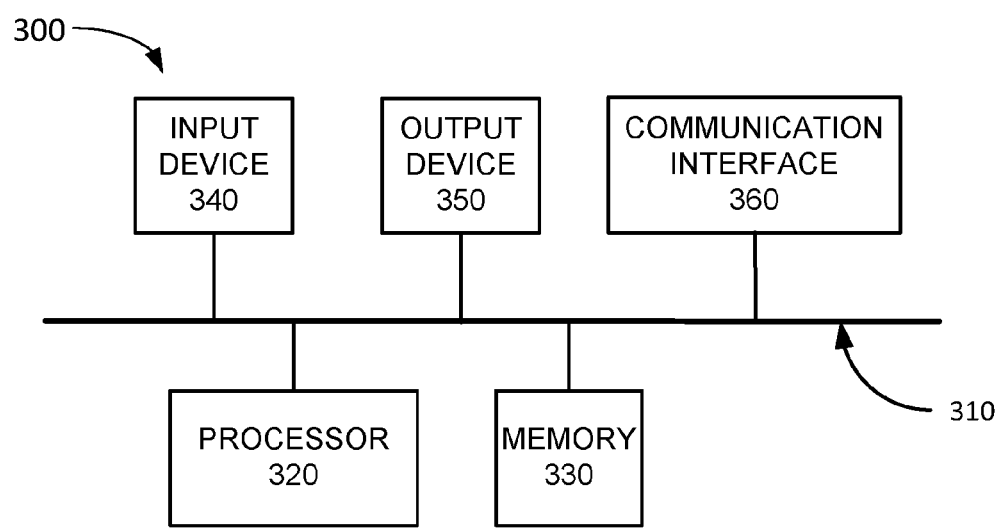
FIG. 3 is a diagram illustrating exemplary components of a device that may be included in a device of FIG. 1 or a device of FIG. 2.

FIG. 3 is a diagram illustrating example components of a device 300 according to an implementation described herein. UE device 110, eNodeB 210, MME 220, SGW 230, PGW 240, HSS 250, ePDG 260, and/or AAA 265 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350.

In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to handovers between LTE and WiFi. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4A:
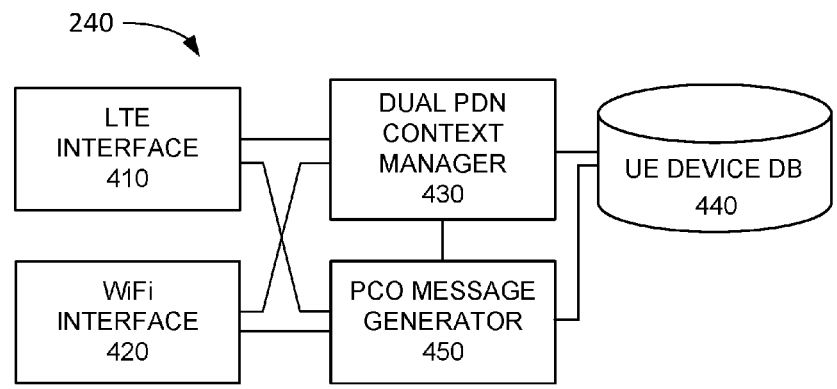
FIG. 4A is a diagram illustrating exemplary functional components of the Packet Data Network Gateway of FIG. 2.

FIG. 4A is a diagram illustrating exemplary functional components of PGW 240. The functional components of PGW 240 may be implemented, for example, via processor 320 executing instructions from memory 330. Alternatively, some or all of the functional components included in PGW 240 may be implemented via hard-wired circuitry. As shown in FIG. 4, PGW 240 may include an LTE interface 410, a WiFi interface 420, a dual context manager 430, a UE device database (DB) 440, and a PCO message generator 450.

LTE interface 410 may be configured to communicate with MME 220 and/or SGW 230. For example, LTE interface 410 may receive Diameter protocol messages from MME 220 via S6a interface 284 and may send Diameter protocol messages to MME 220 using S6a interface 284. WiFi interface 420 may be configured to communicate with WiFi AP 130 via ePDG 260. For example, WiFi interface 420 may receive packets from ePDG 260 via S2b interface 286.

Dual context manager 430 may designate particular UE devices 110 as being associated with a dual PDN context. For example, dual context manager 430 may receive a request for dual PDN context from UE device 110 via LTE interface 410 (e.g., via MME 220) or via ePDG 260 during an attachment request or during a handover request. In response, dual context manager 430 may designate UE device 110 as having dual PDN context by storing an indication of dual PDN context in UE device DB 440.

UE device DB 440 may store information relating to particular UE devices 110. Exemplary information that may be stored in UE device DB 440 is described below with reference to FIG. 4B. PCO message generator 450 may generate a PCO message to be sent to UE device 110 during an attach procedure and/or during a handover procedure as part of the PDN bearer activation procedure. The generated PCO message may include an indication of dual PDN context for UE device 110 when UE device 110 is designated as having dual PDN context.

Although FIG. 4A shows exemplary components of PGW 240, in other implementations, PGW 240 may include fewer components, different components, additional components, or differently arranged components than depicted in FIG. 4A. Additionally or alternatively, one or more components of PGW 240 may perform one or more tasks described as being performed by one or more other components of PGW 240.

Figure 4B:
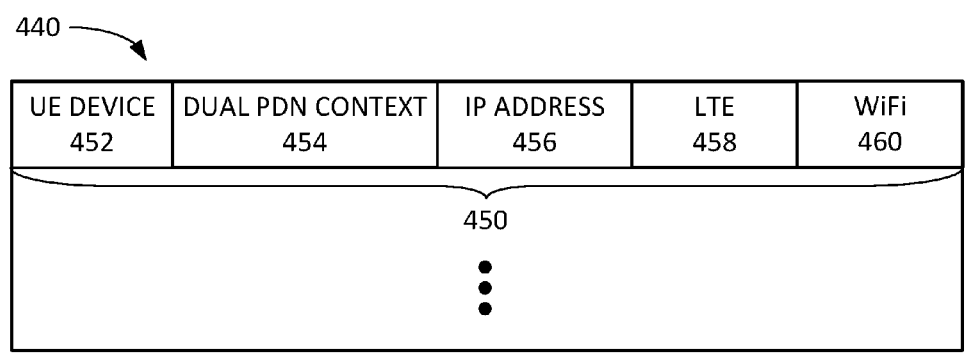
FIG. 4B is a diagram illustrating exemplary components of the user equipment device database of FIG. 4A.

FIG. 4B is a diagram illustrating exemplary components that may be stored in UE device DB 440. As shown in FIG. 4B, UE device DB 440 may include one or more UE device records 450. Each UE device record 450 may store information relating to a particular UE device 110. UE device record 450 may include a UE device field 452, a dual PDN context field 454, an IP address field 456, an LTE field 458, and a WiFi field 460.

UE device field 452 may store information identifying the particular UE device 110. As an example, UE device field 452 may include an EPS bearer identifier. As another example, UE device 452 may include a Media Access Control (MAC) address, an Internet Protocol (IP) address, a Session Initiation Protocol (SIP) address, a Mobile Station International Subscriber Directory Number (MSISDN), an International Mobile Subscriber Identity (IMSI) number, a Mobile Directory Number (MDN); and/or by another type of identifier associated with UE device 110.

Dual PDN context field 454 may store information identifying whether the particular UE device 110 is associated with a dual PDN context. For example, dual PDN context field 454 may correspond to a flag that may be set if the particular UE device 110 is associated with dual PDN context. IP address field 456 may store an IP address associated with the particular UE device 110. As an example, IP address field 456 may store an IP address assigned to the particular UE device 110 by PGW 240 when the particular UE device 110 attaches to the LTE network via eNodeB 210. As another example, IP address field 456 may store an IP address assigned to the particular UE device 110 by PGW 240 when the particular UE device 110 attaches via ePDG 260 and WiFi AP 130. The same IP address may be used for a PDN connection via WiFi 130 and via a PDN connection via eNodeB 210.

LTE field 458 may store information identifying an LTE bearer associated with the particular UE device 110. For example, LTE field 458 may store an Evolved Packet System (EPS) bearer identifier (ID) associated with the particular UE device 110. Furthermore, LTE field 458 may store an information identifying whether the LTE bearer is active (e.g., being used to send and/or receive data). WiFi field 460 may store information identifying a bearer ID associated with ePDG 260. Furthermore WiFi field 460 may store information identifying whether the bearer ID associated with ePDG 260 is active (e.g., being used to send and/or receive data).

Although FIG. 4B shows exemplary components of UE DB 440, in other implementations, UE DB 440 may include fewer components, different components, additional components, or differently arranged components than depicted in FIG. 4B.

Figure 5:
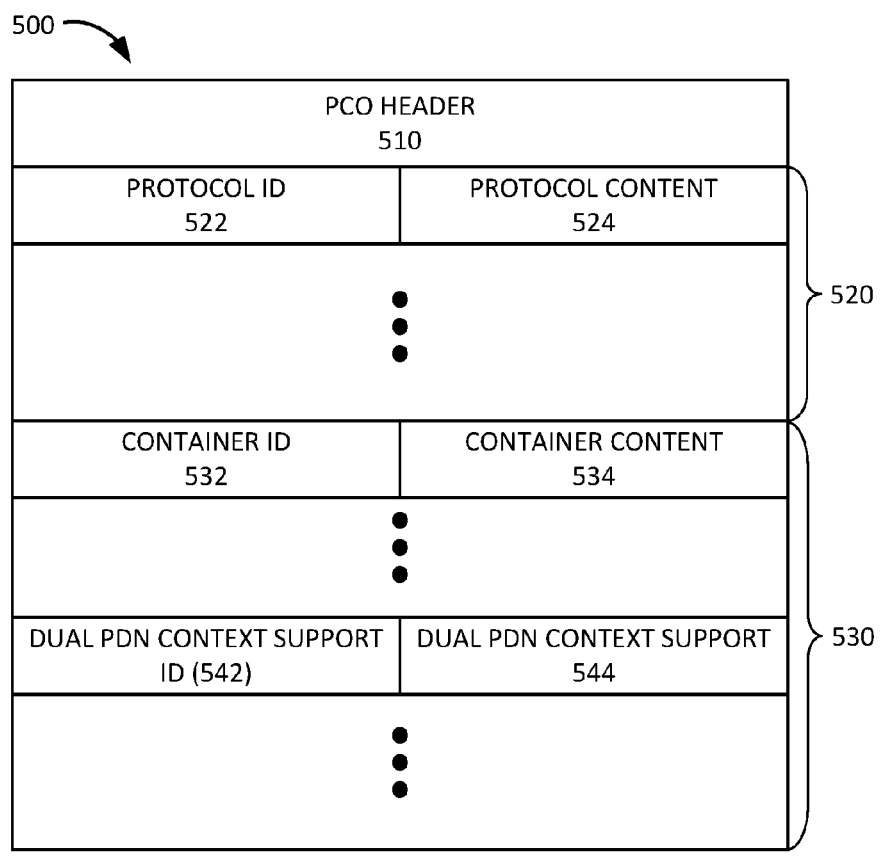
FIG. 5 is a diagram illustrating an exemplary Protocol Configuration Options (PCO) message according to an implementation described herein.

FIG. 5 is a diagram illustrating an exemplary PCO message 500 according to an implementation described herein. As shown in FIG. 5, PCO message 500 may include a PCO header 510, one or more protocol fields 520, and one or more container fields 530.

PCO header 510 may include information identifying the message as a PCO message. Protocol field 520 may include a protocol ID field 522 and a protocol content field 525. Protocol ID field 522 may identify a particular protocol and protocol content field 525 may include content associated with a particular protocol. The particular protocol may correspond to a protocol used by access network 120 to communicate with UE device 110.

Container field 530 may include a container ID field 532 and a container content field 534. Container ID field 532 may identify a particular container and container content field 534 may store content associated with the particular container. Each particular container may be assigned to carry a particular piece of information or multiple pieces of information. Container fields 530 may include a dual PDN context container that includes a dual PDN context support ID field 542 and a dual PDN context support field 544. Dual PDN context support ID field 542 may identify the dual PDN context container. Dual PDN context support field 544 may include information indicating whether dual PDN context is supported for UE device 110. For example, dual PDN context support field 544 may include a flag that is set when dual PDN context is supported for UE device 110.

Although FIG. 5 shows exemplary fields of PCO message 500, in other implementations, PCO message 500 may include different, differently arranged, fewer, or additional fields than depicted in FIG. 5.

Figure 6:
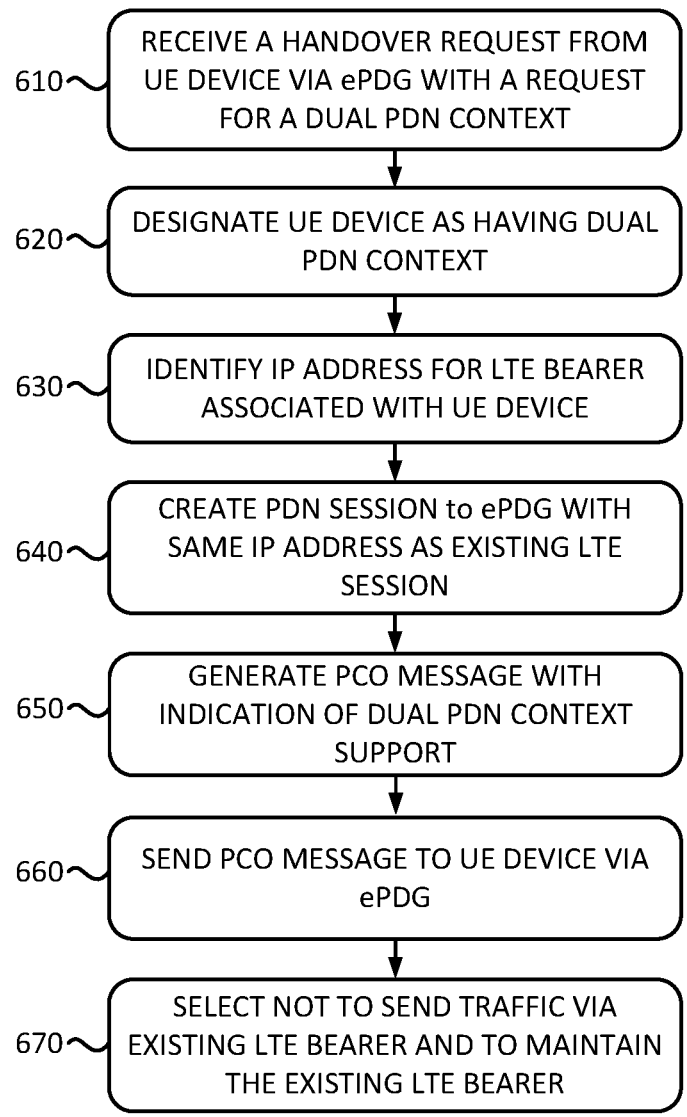
FIG. 6 is a flowchart of a first process for handling a handover according to an implementation described herein.

FIG. 6 is a flowchart of a process for handling a handover from LTE to WiFi according to an implementation described herein. In some implementations, the process of FIG. 6 may be performed by PGW 240. In other implementations, some or all of the process of FIG. 6 may be performed by another device or a group of devices separate from PGW 240, such as another component of access network 120.

The process of FIG. 6 may include receiving a handover request from UE device 110 via ePDG 260 with a request for a dual PDN context (block 610). For example, PGW 240 may receive a create session request from ePDG 260 with a dual PDN context request included in the create session request. UE device 110 may be designated as having dual PDN context (block 620). For example, PGW 240 may set a flag in dual PDN context 454 for UE device record 450 of UE device 110.

An IP address for an LTE bearer associated with UE device 110 may be identified (block 630) and a PDN session may be created to ePDG 260 with the same IP address as an existing LTE session (block 640). For example, PGW 240 may generate a PDN connection to ePDG 260 by allocating resources for a PDN connection to ePDG 260 and may generate a bearer ID for the generated PDN connection. Furthermore, PGW 240 may identify the IP address associated with an existing LTE bearer based on information stored in UE device record 450 (and/or based on other information, such as information received from MME 220 and/or HSS 250) and may associate the identified IP address with a PDN session created between PGW 240 and ePDG 260.

A PCO message with an indication of dual PDN context support may be generated (block 650) and sent to UE device 110 via ePDG 260 (block 660). For example, PGW 240 may generate PCO message 500 that includes dual PDN context support field 544 indicating that UE device 110 has been designated as having dual PDN context. PGW 240 may send the PCO message to UE device via ePDG 260 in a create session response message. The create session response may include the assigned IP address and bearer ID.

A selection not to send traffic via the existing LTE bearer and to maintain the existing LTE bearer may be made (block 670). For example, PGW 240 may select to send data traffic via the created PDN connection to ePDG 260 and not to send traffic via the existing LTE bearer associated with UE device 110 while UE device 110 is connected to PGW 240 via ePDG 260. Furthermore, PGW 240 may select to maintain the existing LTE bearer, rather than tear down the LTE bearer, while UE device 110 is connected to PGW 240 via ePDG 260. Moreover, UE device 110 may maintain the LTE bearer and select not to send any data over the LTE bearer, while UE device 110 is connected to PGW 240 via ePDG 260.

Figure 7:
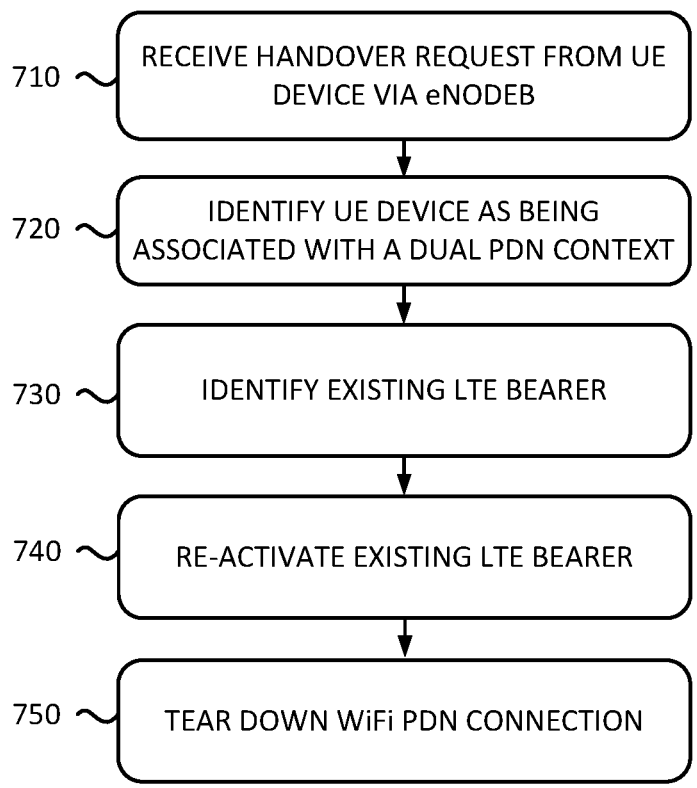
FIG. 7 is a flowchart of a second process for handling a handover according to an implementation described herein.

FIG. 7 is a flowchart of a process for handling a handover from WiFi to LTE according to an implementation described herein. In some implementations, the process of FIG. 7 may be performed by PGW 240. In other implementations, some or all of the process of FIG. 7 may be performed by another device or a group of devices separate from PGW 240, such as another component of access network 120.

The process of FIG. 7 may include receiving a handover request from UE device 110 via eNodeB 210 (block 710). For example, UE device 110 may detect that the signal strength for signals received from WiFi AP 130 has dropped below a signal strength threshold and may select to request a handover to LTE. UE device 110 may send an attach request with a type=handover value to MME 220 via eNodeB 210 and MME 220 may send a create session request message, with a type=handover value, to PGW 240. The attach request and the create session request messages may include information identifying UE device 110, such as an EPS bearer ID.

UE device 110 may be identified as being associated with a dual PDN context (block 720). For example, PGW 240 may identify a UE device record 450 associated with UE device 110 based on the identifying information included in the received create session request message (e.g., an EPS bearer ID) and may check dual PDN context field 454 to determine whether UE device 110 is associated with dual PDN context.

An existing LTE bearer may be identified and re-activated (block 730 and block 740) and the WiFi PDN connection may be torn down (block 750). For example, PGW 240 may identify an existing LTE bearer based on information stored in LTE field 458 of UE device record 450 and may re-activate the LTE bearer by sending an LTE re-activation message to MME 220. MME 220 may forward the re-activation message to eNodeB 210 and UE device 110. MME 220 may receive a response back from UE device 110 via eNodeB 210 and may send an update bearer message back to PGW 240. After PGW 240 responds to the update bearer message, re-activation of the LTE bearer may be completed. After the LTE bearer is re-activated, the WiFi PDN connection may be torn down. For example, PGW 240 may send a delete bearer request to ePDG 260 and may receive a delete bearer response back from ePDG 260 indicating that the PDN connection has been torn down.

Figure 8:
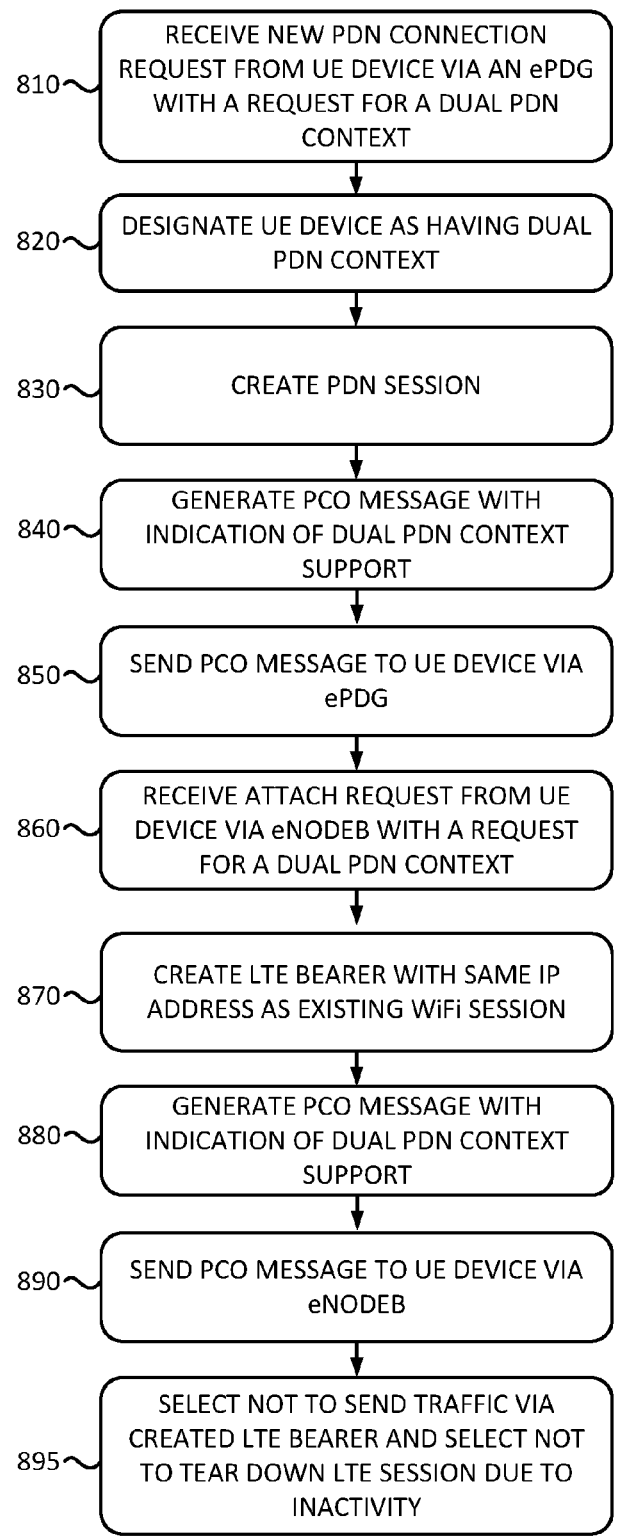
FIG. 8 is a flowchart of a third process for handling a handover according to an implementation described herein.

FIG. 8 is a flowchart of a process for attaching to LTE after a WiFi connection is established according to an implementation described herein. In some implementations, the process of FIG. 8 may be performed by PGW 240. In other implementations, some or all of the process of FIG. 8 may be performed by another device or a group of devices separate from PGW 240, such as another component of access network 120.

The process of FIG. 8 may include receiving a new PDN connection request from UE device 110 via ePDG 260 with a request for a dual PDN context (block 810), UE device 110 may be designated as having dual PDN context (block 820), and a PDN session may be created (block 830). For example, PGW 240 may receive a create session request from ePDG 260 with a dual PDN context request included in the create session request. PGW 240 may set a flag in dual PDN context 454 for UE device record 450 of UE device 110 to designate UE device 110 as having dual PDN context. A PDN session may be created to ePDG 260 by allocating the resources for a PDN connection to ePDG 260, assigning a bearer ID to the PDN connection, and by assigning an IP address to UE device 110.

A PCO message may be generated with an indication of dual PDN context (block 840) and the PCO message may be sent to UE device 110 via ePDG 260 (block 850). For example, PGW 240 may generate PCO message 500 that includes dual PDN context support field 544 indicating that UE device 110 has been designated as having dual PDN context. PGW 240 may send the PCO message to UE device 110 via ePDG 260 in a create session response message. The create session response may include the assigned IP address and bearer ID.

At a later time, UE device 110 may detect an LTE network and may initiate an attach procedure to attach to the LTE network. An attach request may be received from UE device 110 via eNodeB 210 with a request for dual PDN context (block 860) and an LTE bearer may be created with the same IP address as existing WiFi session (block 870). For example, PGW 240 may identify a UE device record 450 associated with UE device 110 based on the identifying information included in the received create session request message (e.g., a UE ID) and may check dual PDN context field 454 to determine whether UE device 110 is associated with dual PDN context. PGW 240 may determine that UE device 110 is associated with dual PDN context and may identify the IP address assigned to UE device 110 based on information stored in UE device record 450 (and/or based on other information, such as information received from MME 220 and/or HSS 250). PGW 240 may generate an LTE bearer by allocating resources for a PDN connection to UE device 110 via eNodeB 210, may generate an EPS bearer ID for the generated LTE bearer, and may associate the generated LTE bearer with the identified IP address assigned to UE device 110.

A PCO message with an indication of dual PDN context support may be generated (block 880) and sent to UE device 110 via eNodeB 210 (block 890). For example, PGW 240 may generate PCO message 500 that includes dual PDN context support field 544 indicating that UE device 110 has been designated as having dual PDN context. PGW 240 may send the PCO message to UE device via eNodeB 210 in a create session response message to MME 220. The create session response may include the assigned IP address and EPS bearer ID. MME 220 may translate the create session response message to an activate default EPS bearer context request message for UE device 110 via eNodeB 210.

A selection not to send traffic via the created LTE bearer and to not tear down the created LTE bearer due to inactivity may be made (block 895). For example, PGW 240 may select to continue sending traffic via the existing PDN connection to ePDG 260 and not to send traffic via the created LTE bearer while UE device 110 is connected to PGW 240 via ePDG 260. Furthermore, PGW 240 may select to maintain the existing LTE bearer, rather than tear down the LTE bearer due to inactivity, while UE device 110 is connected to PGW 240 via ePDG 260.

Figure 9:
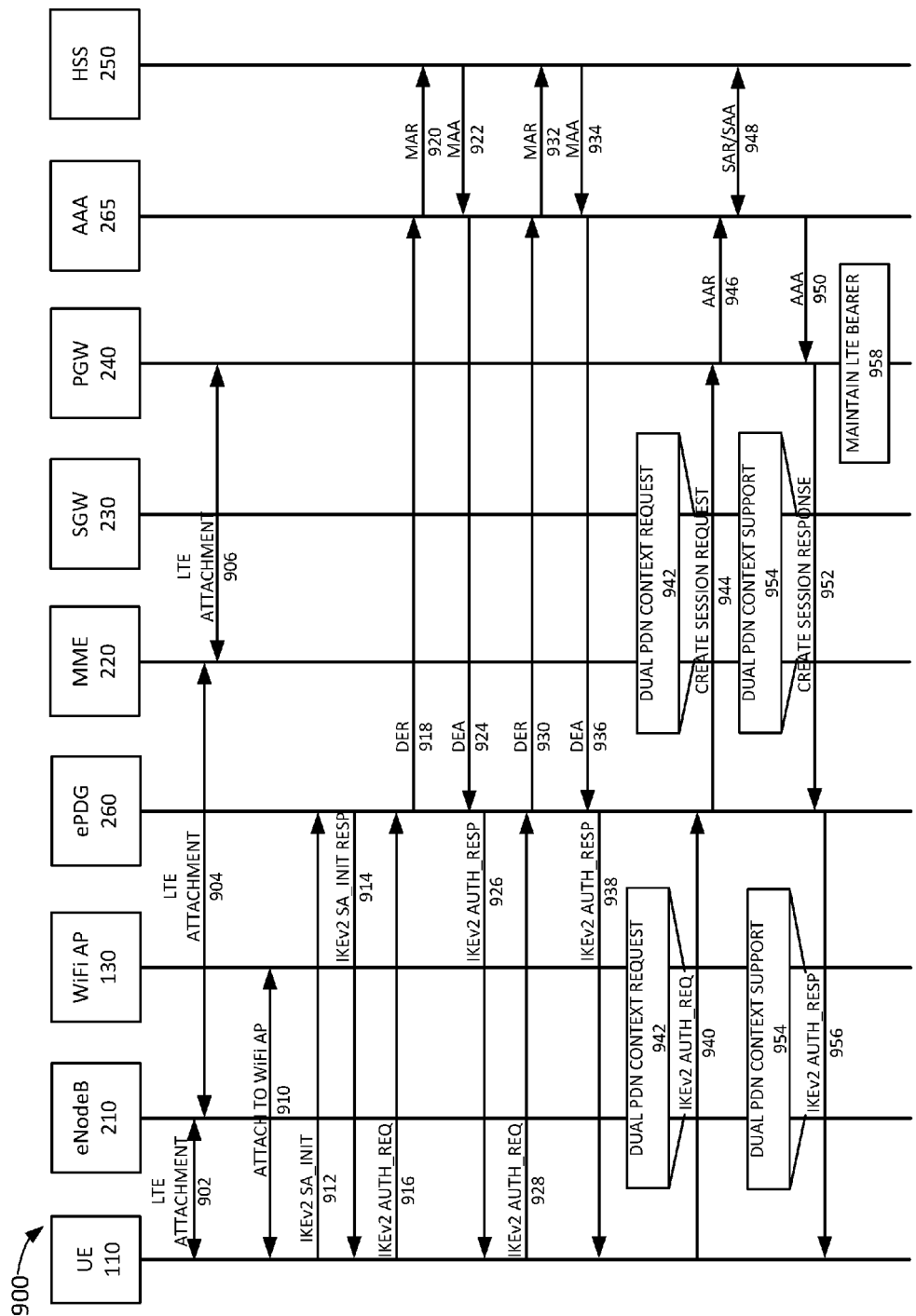
FIG. 9 is a diagram of a first exemplary signal flow according to an implementation described herein.

FIG. 9 is a diagram of a first exemplary signal flow 900 according to an implementation described herein. Signal flow 900 illustrates a handover from LTE to WiFi. Assume UE device 110 has previously attached to an LTE network via eNodeB 210 and PGW 240 (signals 902, 904, and 906). Thus, an LTE bearer has been established from UE device 110 to PGW 240.

At a later time, UE device 110 may attach to WiFi AP 130 after entering the vicinity of WiFi AP 130 (signal 910) and may request a handover to ePDG 260. UE device 110 may send an Internet Key Exchange (IKE) version 2 (IKEv2) Security Association (SA) Initiation (SA_INIT) message to ePDG 260 via WiFi AP 130 (signal 912) and ePDG 260 may respond with an IKEv2 SA_INIT Response (RESP) message (signal 914). UE device 110 may follow up with an IKEv2 Authorization Request (AUTH_REQ) to ePDG 260, which may include information identifying UE device 110 and information identifying the APN to which UE device 110 is trying to establish a connection (signal 916).

ePDG 260 may send a Diameter Extensible Authentication Protocol (EAP) Request (DER) to AAA 265 to authenticate and authorize UE device 110 using the identity and APN information associated with UE device 110 (signal 918). AAA 265 may request subscriber information for UE device 110 from HSS 250 using a Multimedia Authorization Request (MAR) and HSS 250 may respond with a Multimedia Authorization Answer (MAA) providing the requested subscriber information (signals 920 and 922). After obtaining the subscriber information AAA 265 may send an authentication challenge with a Diameter EAP Answer (DEA) message (signal 924). ePDG 260 may forward the authentication challenge to UE device 110 via an IKEv2 AUTH_RESP (signal 926) and UE device 110 may respond to the authentication message via an IKEv2 AUTH_REQ message (signal 928). ePDG 260 may forward the challenge response to AAA 265 via a DER message (signal 930) and AAA 265 may check the challenge response with HSS 250 via MAR and MAA messages (signals 932 and 934). After authenticating UE device 110, AAA 265 sends the authentication and authorization answer, including any service authorization parameters and/or a Master Session Key (MSK), to ePDG 260 (signal 936) and ePDG 260 may forward an authentication success message to UE device 110 via an IKEv2 AUTH_RESP message (signal 938). UE device 110 may now be authenticated and ready to establish a PDN connection.

UE device 110 may send a PDN connection request with a handover request using a IKEv2 AUTH_REQ message to ePDG 260 via WiFi AP 130 (signal 940). The PDN connection request may include a request for dual PDN context (item 942). ePDG 260 may receive the PDN connection request and may send a create session request to PGW 240 based on the received PDN connection request (signal 944). The create session request may include request for dual PDN context 942.

PGW 240 may authenticate the PDN connection request with AAA 265 using an Authentication and Authorization Request (AAR) message (signal 946). AAA 265 may authenticate the PDN connection request with HSS 250 using a Server Assignment Request (SAR) message and a Server Assignment Answer (SAA) message (signal 948) and may respond with an Authentication and Authorization Answer (AAA) message (signal 950). After the PDN connection request is authenticated, PGW 240 may send a create session response back to ePDG 260 (signal 952). The create session response may include a PCO message that includes an indication of dual PDN context support (item 954). ePDG 260 may receive the create session response and may send an IKEv2 AUTH_RESP message to UE device 110 (signal 956). The AUTH_RESP message may include the PCO message 954 with the indication of dual PDN context support. PGW 240 may maintain the LTE bearer (block 958). Thus, PGW 240 may not tear down the LTE bearer after the PDN connection has been established via ePDG 260.

Figure 10:
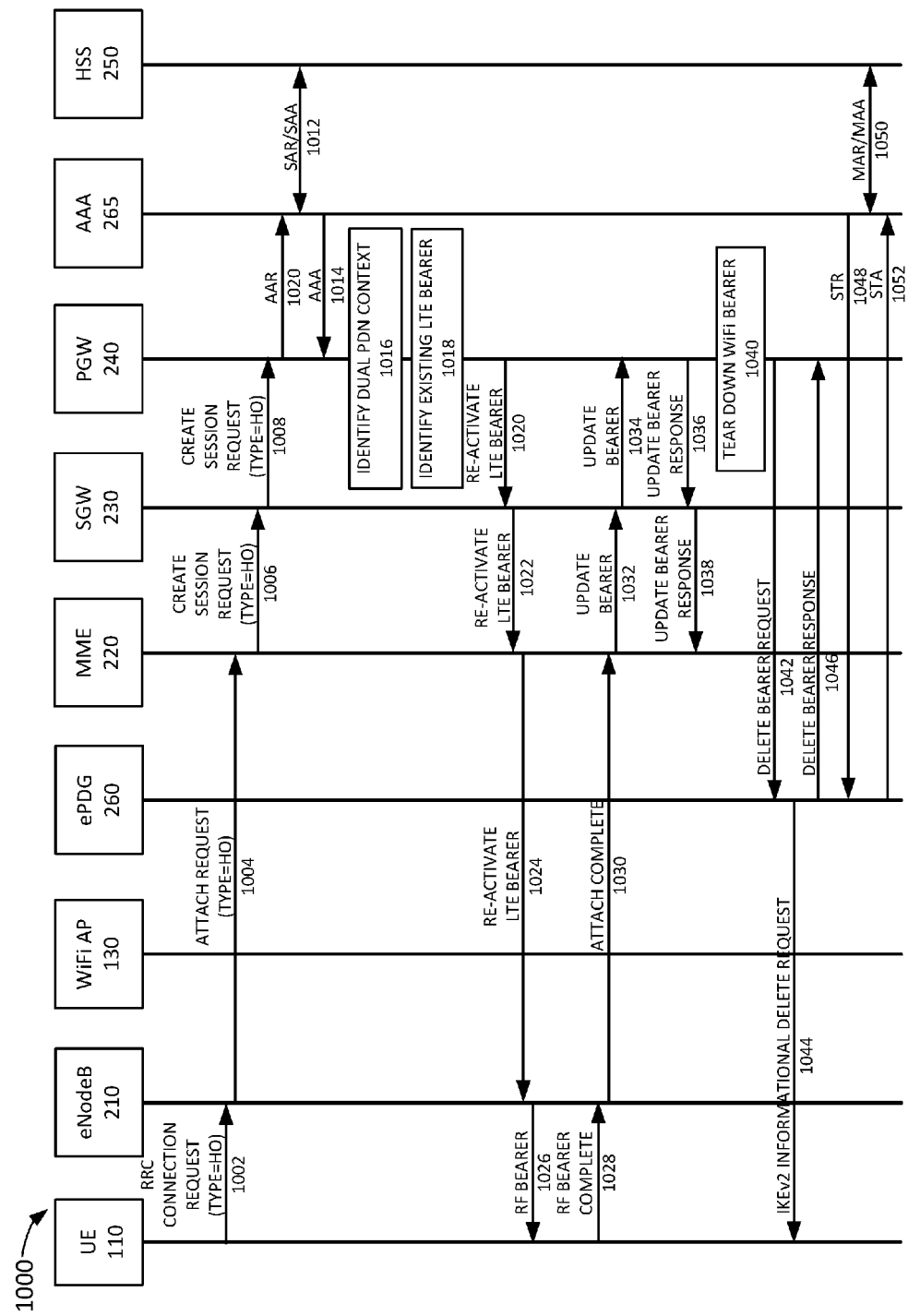
FIG. 10 is a diagram of a second exemplary signal flow according to an implementation described herein.

FIG. 10 is a diagram of a second exemplary signal flow 1000 according to an implementation described herein. Signal flow 1000 illustrates a handover from WiFi to LTE with an existing LTE bearer. For example, signal flow 1000 may follow the events of signal flow 900. Assume UE device 110 has lost the connection to WiFi AP 130. In response, UE device 110 may send a Radio Resource Control (RRC) Connection Request with a type=handover value to eNodeB 210 (signal 1002). eNodeB 210 may send an attach request (with a type=handover value) to MME 220 (signal 1004). MME 220 may respond by sending a create session request (with a type=handover value) to PGW 240 via SGW 230 (signals 1006 and 1008). The type=handover value may be included in the NAS PDN connection request and the PDN connection request may be piggybacked with the NAS attach request.

PGW 240 may authenticate the handover request with AAA 265 using an AAR message (signal 1020). AAA 265 may authenticate the PDN connection request with HSS 250 using SAR/SAA messages (signal 1012) and may respond with an AAA message (signal 1014). PGW 240 may identify a UE device record 450 associated with UE device 110 based on the identifying information included in the received create session request message (e.g., an EPS bearer ID) and may determine, based on dual PDN context field 454 of UE device record 450, that UE device 110 is associated with dual PDN context (block 1016).

PGW 240 may then identify the existing LTE bearer based on information stored in LTE field 458 of UE device record 450 (block 1018) and may re-activate the LTE bearer by sending an LTE re-activation message to MME 220 via SGW 230 (signals 1020 and 1022). MME 220 may forward the re-activation message to eNodeB 210 using, for example, a NAS activate default EPS bearer context request message (signal 1024). eNodeB 210 may set up an RF bearer with UE device 110 by sending an RF bearer message to UE device 110 and receiving an RF bearer complete message back from UE device 110 (signals 1026 and 1028). eNodeB 210 may send an attach complete message back to MME 220 (signal 1030) after receiving the RF bearer complete message. MME 220 may send an update bearer message to PGW 240 via SGW 230 (signals 1032 and 1034) and PGW 240 may reply with an update bearer response via SGW 230 (signals 1036 and 1038).

After handover to LTE is completed, PGW 240 may then select to tear down the WiFi PDN connection (block 1040). PGW 240 may send a delete bearer request to ePDG 260 (signal 1042) and ePDG 260 may send an IKEv2 information delete request to UE device 110 (signal 1044). ePDG 260 may delete resources associated with the PDN connection to UE device 110 and may respond with a delete bearer response (signal 1046). Furthermore, ePDG 260 may send a Diameter session termination request (STR) to AAA 265 (signal 1048). AAA 265 may authenticate the request with HSS 250 using MAR/MAA messages (signal 1050) and may respond with a Diameter session termination answer (STA) (signal 1052).

Figure 11:
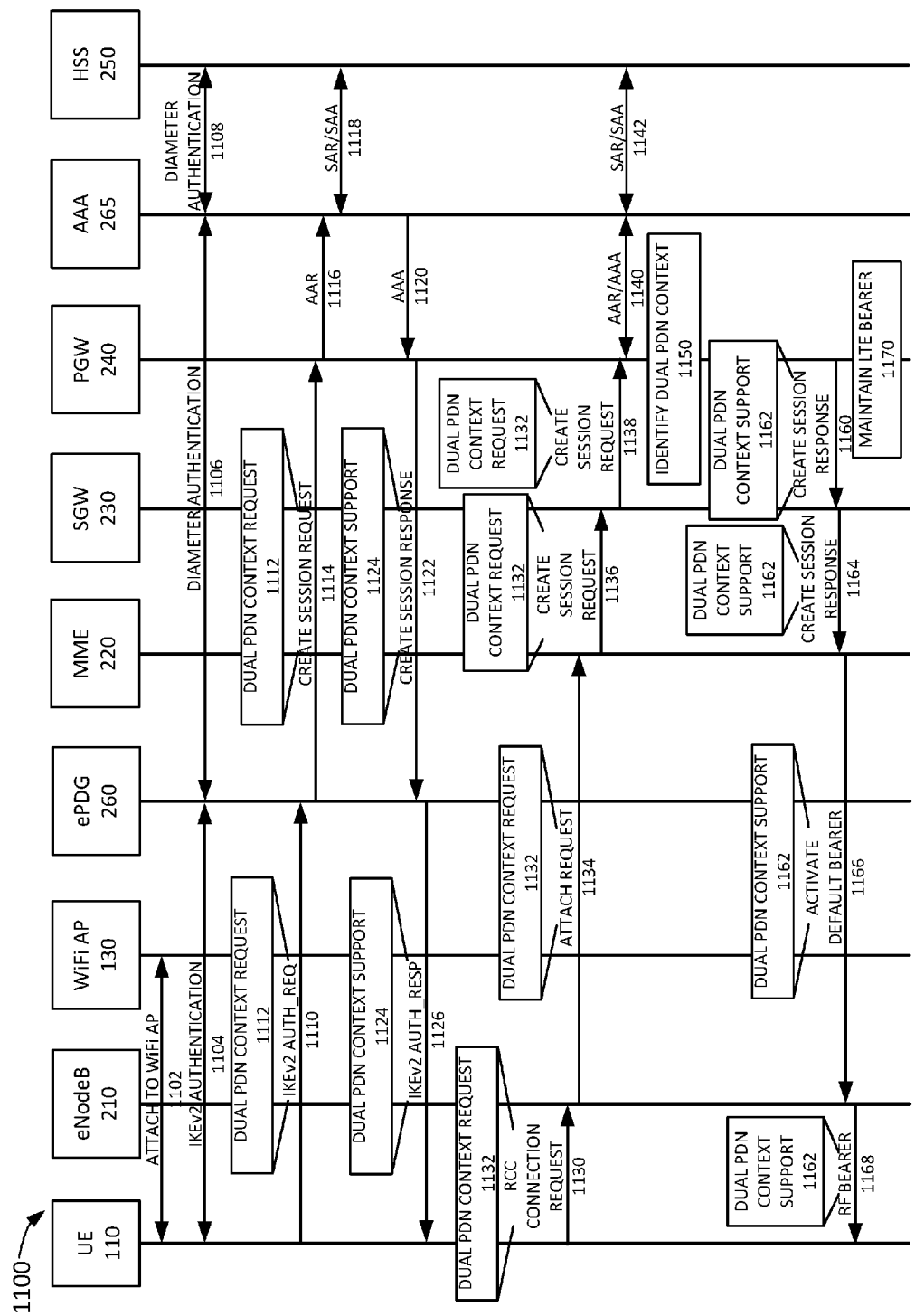
FIG. 11 is a diagram of a third exemplary signal flow according to an implementation described herein.

FIG. 11 is a diagram of a third exemplary signal flow 1100 according to an implementation described herein. Signal flow 1100 illustrates attachment to WiFi using ePDG 260 when no previous LTE attachment has occurred, followed by LTE attachment when an LTE network becomes available.

UE device 110 may attach to WiFi AP 130 after entering the vicinity of WiFi AP 130 (signal 1102) and may perform IKEv2 authentication with ePDG 260 (signal 1104). ePDG may perform Diameter authentication with HSS 250 via AAA 265 (signals 1106 and 1108). UE device 110 may send a PDN connection request using a IKEv2 AUTH_REQ message to ePDG 260 via WiFi AP 130 (signal 1110). The PDN connection request may include a request for dual PDN context (item 1112). ePDG 260 may receive the PDN connection request and may send a create session request to PGW 240 based on the received PDN connection request (signal 1114). The create session request may include request for dual PDN context 1112.

PGW 240 may authenticate the PDN connection request with AAA 265 using an AAR message (signal 1116). AAA 265 may authenticate the PDN connection request with HSS 250 using SAR/SAA messages (signal 1118) and may respond with an AAA message (signal 1120). After the PDN connection request is authenticated, PGW 240 may send a create session response back to ePDG 260 (signal 1122). The create session response may include a PCO message that includes an indication of dual PDN context support (item 1124). ePDG 260 may receive the create session response and may send an IKEv2 AUTH_RESP message to UE device 110 (signal 1126). The AUTH_RESP message may include the PCO message 1124 with the indication of dual PDN context support.

At a later time, UE device 110 may detect an LTE network. In response, UE device 110 may send a Radio Resource Control (RRC) Connection Request to eNodeB 210 (signal 1130). The RCC Connection Request may include a request for dual PDN context (item 1132). eNodeB 210 may send a NAS attach request to MME 220 (signal 1134). Request for the dual PDN context 1132 may be part of the NAS PDN connection request and the PDN connection request may be piggybacked with the NAS attach request. MME 220 may respond by sending a create session request to PGW 240 via SGW 230 (signals 1136 and 1138). The create session request may include the request for dual PDN context 1132.

PGW 240 may request AAA 265 to authenticate the handover request using AAR/AAA messages and AAA 265 may authenticate with HSS 250 using SAR/SAA messages (signals 1140 and 1142). PGW 240 may identify a UE device record 450 associated with UE device 110 based on the identifying information included in the received create session request message (e.g., an EPS bearer ID) and may determine, based on dual PDN context field 454 of UE device record 450, that UE device 110 is associated with dual PDN context (block 1150).

PGW 240 may then generate an LTE bearer by allocating resources for a PDN connection to UE device 110 via eNodeB 210, may generate an EPS bearer ID for the generated LTE bearer, and may associate the generated LTE bearer with the identified IP address assigned to UE device 110. PGW 240 may generate a PCO message with an indication of dual PDN context support (item 1162) and send the PCO message to MME 220 in a create session response (signals 1160 and 1164). The create session response may include the assigned IP address and EPS bearer ID. MME 220 may send an activate default bearer message to eNodeB 210 (signal 1166). The activate default bearer message may include PCO message 1162. eNodeB 210 may send an RF bearer message to UE device 110 (signal 1168) with PCO message 1162. In particular, the RF bearer message may correspond to an RRC re-configuration message that includes an Evolved Packet System Session Management (ESM) container. The ESM container may include an activate default EPS bearer context request message which in turn includes PCO message 1162.

After the LTE bearer is established, PGW 240 may maintain the LTE bearer (block 1170). Thus, PGW 240 may select not to send traffic via the created LTE bearer and to not tear down the LTE bearer after the PDN connection has been established via ePDG 260.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6, 7, and 8, and a series of signal flows has been described with respect to FIGS. 9, 10, and 11, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    receiving, by a computer device, a handover request from a user equipment (UE) device via an evolved Packet Data Gateway (ePDG) device, wherein the handover request includes a request for a dual Packet Data Network (PDN) context, wherein the dual PDN context indicates that the UE device is associated with a same IP address whether connected via a Long Term Evolution (LTE) network or a WiFi network;
    designating, by the computer device, the UE device as having the dual PDN context, based on the received handover request;
    identifying, by the computer device, an Internet Protocol (IP) address for an LTE bearer associated with the UE device;
    creating, by the computer device, a PDN session to the ePDG device using the identified IP address, based on designating the UE device as having the dual PDN context;
    sending, by the computer device, a Protocol Configuration Options (PCO) message to the UE device via the ePDG device, wherein the PCO message includes an indication of dual PDN context support; and
    selecting, by the computer device, to maintain the LTE bearer.

2. The method of claim 1, wherein the dual PDN context identifies a dual IP Multimedia Subsystem (IMS) PDN context associated with an IMS access point name (APN).

3. The method of claim 1, further comprising:
    selecting not to send traffic via the maintained LTE bearer while the created PDN session to the ePDG device is active.

4. The method of claim 1, further comprising:
receiving another handover request from the UE device via an eNodeB;
identifying the UE device as having the dual PDN context, in response to receiving the other handover request from the UE device via the eNodeB;
re-activating the LTE bearer associated with the UE device, in response to identifying the UE device as having the dual PDN context; and
tearing down the PDN session to the ePDG device, in response to re-activating the LTE bearer associated with the UE device.

5. The method of claim 1, further comprising:
receiving a PDN connection request from another UE device via the ePDG device, wherein the PDN connection request includes a request for another dual PDN context;
designating the other UE device as having the other dual PDN context, based on the received PDN connection request;
creating another PDN session to the ePDG device based on the received PDN connection request; and
sending a PCO message to the other UE device via the ePDG device, wherein the PCO message sent to the other UE device includes an indication of the other dual PDN context support.

6. The method of claim 5, further comprising:
receiving another attach request from the other UE device via a Mobility Management Entity (MME), wherein the other attach request includes a request for the other dual PDN context;
identifying another IP address for the created PDN session to the ePDG device;
creating an LTE bearer for the other UE device using the identified other IP address for the created PDN session to the ePDG device, in response to receiving the other attach request;
sending another PCO message to the other UE device via the MME, wherein the other PCO message sent to the other UE device includes an indication of the other dual PDN context support; and
selecting to maintain the LTE bearer for the other UE device.

7. The method of claim 5, further comprising:
receiving another attach request from the other UE device via a Mobility Management Entity;
determining that the other UE device is designated as having the other dual PDN context; and
attaching the other UE device without creating an LTE PDN bearer from a PDN Gateway (PGW) to an eNodeB.

8. The method of claim 1, wherein the computer device includes a PDN Gateway (PGW) configured to store a database of UE devices that identifies, for a particular UE device, whether the particular UE device has a dual PDN context and whether the particular UE device is associated with an active LTE bearer or an active WiFi bearer.

9. A computer device comprising:
a memory configured to store instructions; and
a processor configured to execute the instructions to:
receive a handover request from a user equipment (UE) device via an evolved Packet Data Gateway (ePDG) device, wherein the handover request includes a request for a dual Packet Data Network (PDN) context, wherein the dual PDN context indicates that the UE device is associated with a same IP address whether connected via a Long Term Evolution (LTE) network or a WiFi network;
designate the UE device as having dual PDN context, based on the received handover request;
identify an Internet Protocol (IP) address for an LTE bearer associated with the UE device;
create a PDN session to the ePDG device using the identified IP address, based on designating the UE device as having the dual PDN context;
send a Protocol Configuration Options (PCO) message to the UE device via the ePDG device, wherein the PCO message includes an indication of dual PDN context support; and
select to maintain the LTE bearer.

10. The computer device of claim 9, wherein the dual PDN context identifies a dual IP Multimedia Subsystem (IMS) PDN context associated with an IMS access point name (APN).

11. The computer device of claim 9, wherein the processor is further configured to:
select not to send traffic via the maintained LTE bearer while the created PDN session to the ePDG device is active.

12. The computer device of claim 9, wherein the processor is further configured to:
receive another handover request from the UE device via an eNodeB;
identify the UE device as having the dual PDN context, in response to receiving the handover request from the UE device via the eNodeB;
re-activate the LTE bearer associated with the UE device, in response to identifying the UE device as having the dual PDN context; and
tear down the PDN session to the ePDG device, in response to re-activating the LTE bearer associated with the UE device.

13. The computer device of claim 9, wherein the processor is further configured to:
receive a PDN connection request from another UE device via the ePDG device, wherein the PDN connection request includes a request for another dual PDN context;
designate the other UE device as having the other dual PDN context, based on the received PDN connection request;
create another PDN session to the ePDG device based on the received PDN connection request; and
send a PCO message to the other UE device via the ePDG device, wherein the PCO message sent to the other UE device includes an indication of the other dual PDN context support.

14. The computer device of claim 13, wherein the processor is further configured to:
receive another attach request from the other UE device via a Mobility Management Entity (MME), wherein the other attach request includes a request for the other dual PDN context;
identify another IP address for the created PDN session to the ePDG device;
create an LTE bearer for the other UE device using the identified other IP address for the created PDN session to the ePDG device, in response to receiving the other attach request;
send another PCO message to the other UE device via the MME, wherein the other PCO message sent to the other UE device includes an indication of the other dual PDN context support; and
select to maintain the LTE bearer for the other UE device.

15. The computer device of claim 13, wherein the processor is further configured to:
receive another attach request from the other UE device via a Mobility Management Entity;
determine that the other UE device is designated as having the other dual PDN context; and attach the other UE device without creating an LTE PDN bearer from a PDN Gateway (PGW) to an eNodeB.

16. The computer device of claim 9, wherein the computer device includes a PDN Gateway (PGW) configured to store a database of UE devices that identifies, for a particular UE device, whether the particular UE device has dual PDN context and whether the particular UE device is associated with an active LTE bearer or an active WiFi bearer.

17. A system comprising:
an evolved Packet Data Gateway (ePDG) configured to:
secure data transmission between a user equipment (UE) device and a Long Term Evolution (LTE) wireless access network; and
a Packet Data Network (PDN) Gateway (PGW) configured to:
receive a handover request from the UE device via the ePDG, wherein the handover request includes a request for a dual PDN context, wherein the dual PDN context indicates that the UE device is associated with a same IP address whether connected via an LTE network or a WiFi network;
designate the UE device as having dual PDN context, based on the received handover request;
identify an Internet Protocol (IP) address for an LTE bearer associated with the UE device;
create a PDN session to the ePDG using the identified IP address, based on designating the UE device as having the dual PDN context;
send a Protocol Configuration Options (PCO) message to the UE device via the ePDG, wherein the PCO message includes an indication of dual PDN context support; and
select to maintain the LTE bearer.

18. The system of claim 17, wherein the PGW is further configured to:
receive another handover request from the UE device via an eNodeB;
identify the UE device as having the dual PDN context, in response to receiving the handover request from the UE device via the eNodeB;
re-activate the LTE bearer associated with the UE device, in response to identifying the UE device as having the dual PDN context; and
tear down the PDN session to the ePDG, in response to re-activating the LTE bearer associated with the UE device.

19. The system of claim 17, wherein the PGW is further configured to:
receive a PDN connection request from another UE device via the ePDG, wherein the PDN connection request includes a request for another dual PDN context;
designate the other UE device as having the other dual PDN context, based on the received PDN connection request;
create another PDN session to the ePDG based on the received PDN connection request; and
send a PCO message to the other UE device via the ePDG, wherein the PCO message sent to the other UE device includes an indication of the other dual PDN context support.

20. The system of claim 19, wherein the PGW is further configured to:
receive another attach request from the other UE device via a Mobility Management Entity (MME), wherein the other attach request includes a request for the other dual PDN context;
identify another IP address for the created PDN session to the ePDG;
create an LTE bearer for the other UE device using the identified other IP address for the created PDN session to the ePDG, in response to receiving the other attach request;
send another PCO message to the other UE device via the MME, wherein the other PCO message sent to the other UE device includes an indication of the other dual PDN context support; and
select to maintain the LTE bearer for the other UE device.

* * * * *